United States Patent Office 3,492,288
Patented Jan. 27, 1970

3,492,288
ADENOSINE ACETALS
Max Thiel and Werner Winter, Mannheim, Kurt Stach, Wolfgang Schaumann, and Karl Dietmann, Mannheim-Waldhof, Germany, assignors to C. F. Boehringer & Soehne G.m.b.H., Mannheim-Waldhof, Germany, a corporation of Germany
No Drawing. Filed Aug. 8, 1967, Ser. No. 659,037
Claims priority, application Germany, Sept. 14, 1966, B 88,907
Int. Cl. C07d 57/16, 99/04; A61k 27/00
U.S. Cl. 260—211.5           4 Claims

ABSTRACT OF THE DISCLOSURE

A novel class of compounds useful in the preparation of medicinal agents because of their cardiovascular and other pharmacodynamic actions is disclosed. These compounds are adenosine acetals and have the following formula:

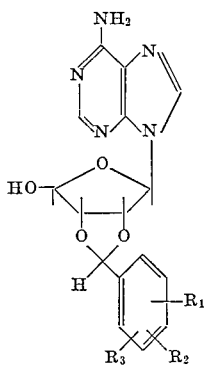

wherein $R_1$ is halogen or lower alkyl and $R_2$ and $R_3$ are each hydrogen, halogen or lower alkyl.

---

This invention relates to adenosine acetals and to processes of making and using the same.

More particularly, this invention relates to compounds having the following formula:

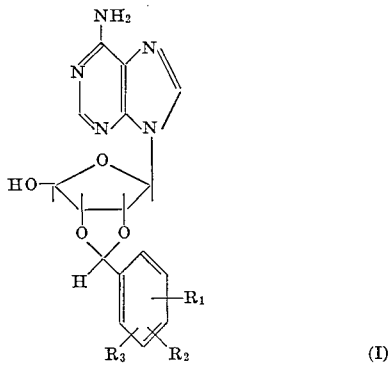

(I)

wherein $R_1$ is halogen or lower alkyl and $R_2$ and $R_3$ are each hydrogen, halogen or lower alkyl.

The new compounds described and claimed herein are highly effective cardiovascular agents.

Said novel adenosine acetals can be prepared, in the known manner, as by the reaction of adenosine with a benzaldehyde of the formula:

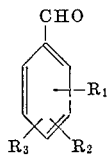

(II)

wherein $R_1$, $R_2$ and $R_3$ have the same meanings as given hereinabove or with an acetal thereof, in the presence of acidic catalysts.

Representative of the acidic catalysts which can be used in the reaction, are zinc chloride, hydrochloric acid, toluene-sulfonic acid and trifluoroacetic acid.

As acetals, it is preferred to use the dimethyl or diethyl acetals.

The process for producing the compounds of the invention is carried out by reacting adenosine with an excess of a benzaldehyde (II) in the presence of zinc chloride. The reaction is considerably accelerated by heating to 50–70° C. In this manner, there is always obtained a mixture of the exo- and endo-isomers.

In the case of the use of acetals of the benzaldehydes (II), the reaction with adenosine is preferably carried out in a polar solvent, such as dimethyl formamide, dioxan or a mixture thereof, hydrochloric acid, toluene-sulfonic acid or trifluoracetic acid being used as acidic catalyst. If the reaction is carried out at temperatures below 5° C., then, in general, the pure exo-isomers are obtained.

A preferred variant of the process according to the present invention is the reaction of adenosine with a benzaldehyde (II) in an acidic medium with methyl or ethyl orthoformate. The acetals which are thereby formed as intermediates then react further, according to the present invention, to give the desired compounds (I).

The following examples are given for the purpose of illustrating the present invention without, however, limiting the same thereto.

EXAMPLE 1

2′,3′-O-(4-chlorobenzylidene)-adenosine 120 g. p-chlorobenzaldehyde dimethyl acetal and 96 ml. 6 N hydrochloric acid in dioxan were successively introduced into a slurry of 60 g. adenosine in 600 ml. dimethyl formamide, at —5 to 0° C. The resulting solution was stirred at 0° C. until it was completely clear. The reaction mixture was then left to stand for 3 days in a refrigerator and for 1 day at ambient temperature. Thereafter, the reaction mixture was poured, with stirring, into a solution of 75 g. ammonium carbonate in 3 litres water. The resulting precipitated material was filtered off with suction and washed with ether. There were thusly obtained 47 g. (54% of theory) 2′,3′-O-(4-chlorobenzylidene)-adenosine, which melted above 250° C. with decomposition. According to the NMR spectrum (6.04 p.p.m. ≙ exo–H)

only the exo-isomer was present; $[\alpha]_D^{20} = -141°$.

EXAMPLE 2

2′,3′-O-(4-chlorobenzylidene)-adenosine
(isomeric mixture)

A reaction mixture prepared according to Example 1 was stirred, not at 0° C., but rather at 40–50° C. for 3 hours. The reaction mixture was then worked up according to the procedure described in Example 1 and resulted in the production of an isomeric mixture having a melting point of 230° C. (decomp.); $[\alpha]_D^{20} = -130°$.

EXAMPLE 3

2′,3′-O-(2-chlorobenzylidene)-adenosine

Following the procedure described in Example 1, there was obtained from 2-chlorobenzaldehyde dimethyl acetal and adenosine in 35% yield, 2′,3′ - O - (2-chlorobenzylidene)-adenosine, which melted above 250° C. with decomposition. According to the NMR spectrum (6.02 p.p.m. ≙ exo–H)

only the exo-isomer was present.

EXAMPLE 4

2′,3′-O-(3-chlorobenzylidene)-adenosine

The procedure described in Example 1 was repeated and starting from 3-chlorobenzaldehyde dimethyl acetal and adenosine, there was obtained, in 30% yield, 2′,3′-O-(3-chlorobenzylidene)-adenosine, which melted above 250° C. with decomposition. According to the NMR spectrum (6.02 p.p.m. ≙ exo–H)

only the exo-isomer was present.

EXAMPLE 5

2′,3′-O-(4-methyl-benzylidene)-adenosine

*Variant A.*—Using a method analogous to that described in Example 1, from 4-methyl-benzaldehyde dimethyl acetal and adenosine, there was obtained, in 48.5% yield, 2′,3′ - O-(4-methyl-benzylidene)-adenosine, which had a melting point of 236–239° C. According to the NMR spectrum (6.01 p.p.m. ≙ exo–H)

only the exo-isomer was present.

*Variant B.*—10 g. adenosine, 28 g. zinc chloride (freshly melted) and 140 ml. 4-methyl-benzaldehyde were shaken together for one day at ambient temperature. The reaction mixture was then poured into 2 N sodium hydroxide solution and extracted with chloroform. The chloroform solution was dried and evaporated and the residue obtained was taken up with ether. The solid material which was formed was filtered off with suction, dissolved in acetone and reprecipitated by the addition of ligroin. There were thusly obtained 6.2 g. (45% of theory) 2′,3′-O-(4-methyl-benzylidene)-adenosine, which had a melting point of 184–196° C. From the thin layer chromatographic analysis of the product, it could be ascertained that it was a mixture of the exo- and endo-isomers.

EXAMPLE 6

2′,3′-O-(3,4-dichlorobenzylidene)adenosine 25 ml. 4.5 N hydrochloric acid in dioxan were added at 0° C. to a mixture of 13.4 g. adenosine, 140 ml. dimethyl formamide and 30 g. 3,4 - dichlorobenzaldehyde dimethyl acetal. The reaction mixture was allowed to stand for 3 days at 0° C. and then poured, with stirring, into a solution of ammonium carbonate. After shaking with a little chloroform, the solid material which was formed was filtered off with suction. There was obtained 4.25 g. (20% of theory) 2′,3′ - O-dichlorobenzylidene)-adenosine, which had a melting point of 254–255° C.

The compounds in accordance with the invention belong to the class of compounds known as nucleoside ketals. This class of compounds is characterized in that they effect simultaneously with an increase in the heart minute volume an increase in the blood circulation to the kidneys. As a result, on administration of a nucleoside ketal, a distinct increase in the excretion of sodium takes place. Therefore the increased excretion of sodium can be used to evaluate the circulation stimulating activity of new compounds falling within this class or structurally closely related to the compounds of this class.

The test procedures involved in determining whether or not there has been an increase in sodium excretion as compared to the procedures involved in directly measuring changes in circulation dynamics are much simpler and easier to carry out. Further the determinations regarding sodium excretion can be carried out using unanesthetized animals and over considerably prolonged periods. In this connection only those compounds are considered effective whose activity is manifested over a prolonged period.

The tests were carried out using female Sprague-Dawley rats. The control sodium values were established, the test compounds were then administered intraperitoneally (10 ml./kg. of an aqueous suspension containing additionally 0.5% tylose). The animals' urine was then collected for 6 hours and the sodium content again determined.

The following compounds were employed in the test procedures:

(A) Isopropylidene-adenosine-comparison.
(B) 2′,3′-O-(4-chlorbenzylidene)-adenosine.
(C) 2′,3′-O-(3-chlorbenzylidene)-adenosine.
(D) 2′,3′-O-(4-methylbenzylidene)-adenosine.
(E) 2′,3′-O-(3,4-dichlorbenzylidene)-adenosine.

The results of the test procedures are set out in the following table:

TABLE.—SODIUM EXCRETION IN URINE FOLLOWING INTRAPERITONEAL ADMINISTRATION OF 25 MG./KG. COMPOUND

| Compound | Example | MVAL Na/Kg. in 6 hr. | Number of rats |
|---|---|---|---|
| Control | | 0.12 | 90 |
| A | (¹) | 0.023 | 30 |
| B | 1 | 1.5 | 45 |
| C | 4 | 2.5 | 15 |
| D | 5 | 1.6 | 15 |
| E | 6 | 0.73 | 15 |

¹ Isopropylidene-adenosine (comparison).

As can be seen from the table the comparison compound, isopropylidene-adenosine was entirely without effect as concerns increased excretion of sodium. In contrast the compounds of the invention acted to cause an increase in the excretion of sodium of up to 20 times that observed in the control (untreated) animal.

As previously indicated, the adenosine derivatives of this invention are readily adapted to therapeutic use as cardio and circulatory agents. The toxicity of the compounds of the invention has been found to be quite low or substantially non-existent when they are administered in amounts that are sufficient to achieve the desired therapeutic effects. Moreover, no other pharmacological side effects have been observed to occur as a result of their administration.

In accordance with the method of treatment of the present invention, the compounds can be given via the oral route. However, the compounds can also be administered as parenterals in the form of their solutions or suspensions. The compounds can be administered either alone and/or preferably in combination with a pharmaceutically acceptable carrier, and such administration can be carried out in both single and multiple dosages. More particularly, the compounds of this invention can be administered in a wide variety of different dosage forms wherein they are combined with various pharmaceutically acceptable inert carriers in the form of tablets, capsules, dragees, powders, aqueous suspensions, solutions, and the like. Such carriers include solid diluents or fillers, liquid aqueous media and various non-toxic organic solvents, etc. In general, the therapeutically effective compounds are present in such dosage forms at concentration levels ranging from about 0.01 to about 90% by weight of the total composition, i.e., in amounts which are sufficient to provide the desired unit dosage.

In dosage unit form, the compounds as set out herein are used in amounts of from 50–500 mg. active ingredient per dosage unit. Preferably, the compositions are compounded so that for parenteral administration, 50–200 mg. of active compound/dosage unit is present and for oral administration 200–500 mg. of compound/dosage unit.

What is claimed is:
1. A compound having the formula:

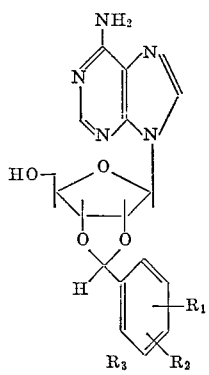

wherein $R_1$ is chloro and $R_2$ and $R_3$ are each a member selected from the group consisting of hydrogen, and chloro.

2. A compound according to claim 1 designated 2′,3′-O-(4-chlorobenzylidene)-adenosine.
3. A compound according to claim 1 designated 2′,3′-O-(3-chlorobenzylidene)-adenosine.
4. A compound according to claim 1 designated 2′,3′-O-(3,4-dichlorobenzylidene)-adenosine.

References Cited

UNITED STATES PATENTS 3,201,289  9/1965  Fujimoto et al. ____ 260—211.5
3,346,562  10/1967  Honjo et al. _____ 260—211.5

LEWIS GOTTS, Primary Examiner
JOHNNIE R. BROWN, Assistant Examiner

U.S. Cl. X.R.
424—180

UNITED STATES PATENT OFFICE
CERTIFICATE OF CORRECTION

Patent No. 3,492,288      Dated January 27, 1970

Inventor(s) Max Thiel, Werner Winter, Kurt Stach, Wolfgang Schaumann and Karl Dietmann It is certified that error appears in the above-identified patent and that said Letters Patent are hereby corrected as shown below:

Column 5, Claim 1, the last part of the formula, a bond should be inserted from $R_3$ into the benzene ring, so that the formula reads as follows:

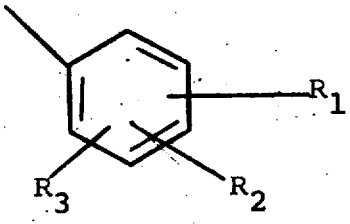

SIGNED AND SEALED
JUN 23 1970

(SEAL)
Attest:

Edward M. Fletcher, Jr.
Attesting Officer

WILLIAM E. SCHUYLER, JR.
Commissioner of Patents